(12) United States Patent
Schwab et al.

(10) Patent No.: US 9,249,769 B1
(45) Date of Patent: Feb. 2, 2016

(54) FUEL ADDITIVES FOR TREATING INTERNAL DEPOSITS OF FUEL INJECTORS

(71) Applicant: Afton Chemical Corporation, Richmond, VA (US)

(72) Inventors: Scott D. Schwab, Richmond, VA (US); Xinggao Fang, Midlothian, VA (US)

(73) Assignee: Afton Chemical Corporation, Richmond, VA (US)

( * ) Notice: Subject to any disclaimer, the term of this patent is extended or adjusted under 35 U.S.C. 154(b) by 0 days.

(21) Appl. No.: 14/667,062

(22) Filed: Mar. 24, 2015

(51) Int. Cl.
| | |
|---|---|
| *C10L 1/24* | (2006.01) |
| *F02M 65/00* | (2006.01) |
| *C10L 10/04* | (2006.01) |
| *F02B 47/04* | (2006.01) |

(52) U.S. Cl.
CPC ............ *F02M 65/008* (2013.01); *C10L 1/2437* (2013.01); *C10L 10/04* (2013.01); *F02B 47/04* (2013.01); *C10L 2200/0263* (2013.01); *C10L 2270/026* (2013.01)

(58) Field of Classification Search
CPC .................. C10L 1/2437; C10L 10/04; C10L 2200/0263; C10L 2270/026; F02B 47/00; F02M 65/008

See application file for complete search history.

(56) References Cited

U.S. PATENT DOCUMENTS

| | | | | |
|---|---|---|---|---|
| 2,778,814 | A | | 1/1957 | Behrens et al. |
| 2,789,892 | A | * | 4/1957 | Pinotti .............................. 44/374 |
| 2,930,681 | A | * | 3/1960 | Barusch ........................... 44/370 |
| 3,015,668 | A | | 1/1962 | Kozikowski |
| 3,594,137 | A | * | 7/1971 | Lonstrup ........................ 44/373 |
| 3,920,414 | A | * | 11/1975 | Steere et al. .................... 44/331 |
| 4,482,357 | A | | 11/1984 | Hanlon |
| 5,102,427 | A | | 4/1992 | Feldman et al. |
| 5,215,548 | A | | 6/1993 | Ashcraft et al. |
| 5,575,823 | A | | 11/1996 | Wallace et al. |
| 6,858,047 | B1 | * | 2/2005 | Norman ........................... 44/370 |
| 2005/0039384 | A1 | | 2/2005 | Gormley |
| 2006/0196110 | A1 | | 9/2006 | Schwahn et al. |
| 2008/0110080 | A1 | * | 5/2008 | Ansell et al. ..................... 44/300 |
| 2009/0158641 | A1 | * | 6/2009 | Hayes et al. ..................... 44/309 |

OTHER PUBLICATIONS

Bennett, J. J; Dell, S. J; Galante-Fox, J. M.; Kulinowski, A. M.; Miller, K. T.; Schwab, S. D., "Internal Injector Deposits in High-Pressure Common Rail Diesel Engines," SAE International Paper No. 2010-01-2242, 2010, pp. 1-17.

* cited by examiner

*Primary Examiner* — Cephia D Toomer
(74) *Attorney, Agent, or Firm* — Luedeka Neely Group, P.C.

(57) ABSTRACT

A fuel composition and method for cleaning up internal components of a fuel injector and for improver injector performance for a diesel engine. The composition includes major amount of middle distillate fuel having a sulfur content of 50 ppm by weight or less, and from about 1 to about 30 ppm by weight based on a total weight of fuel of a fuel soluble hydrocarbyl sulfonic acid or salt such as an alkyl aryl sulfonic acid or salt thereof, wherein the alkyl aryl sulfonic acid or salt thereof is effective to improve injector performance.

19 Claims, No Drawings

FUEL ADDITIVES FOR TREATING INTERNAL DEPOSITS OF FUEL INJECTORS

TECHNICAL FIELD

The disclosure is directed to certain diesel fuel additives and to methods for cleaning and/or preventing internal deposits in injectors for diesel fuel operated engines. In particular the disclosure is directed to methods that are effective against internal deposits in injectors for engines operating on ultra low sulfur diesel fuels.

BACKGROUND AND SUMMARY

To meet increasingly stringent diesel exhaust emissions requirements, original equipment manufacturers (OEMs) have introduced common rail fuel injection systems that develop pressures of up to 2000 bar (29,000 psi). In addition, fuel delivery schemes have become more complicated, often involving multiple injections per cycle. Containing higher pressures and allowing for precise metering of fuel require very tight tolerances within the injector. Such changes have made injectors more sensitive to fuel particulate contamination. Accordingly, injector performance concerns run across all segments; on-road fleets, mining equipment, farming equipment, railroad and inland marine engines.

There are two distinct types of deposits that have been identified on fuel injectors. One type of deposit is a hard carbonaceous deposit that is seen on the injector tips and on the outside of the fuel injectors. Such carbonaceous deposit is based on fuel degradation. The other type of deposit is a waxy, white to yellow deposit that appears as a thin film on the internal surfaces of high-pressure common rail (HPCR) injector needles and command plungers, primarily in the lowest clearance areas of the injector internals or on the pilot valve of the injectors.

If left untreated, the internal deposits may lead to significant power loss, reduced fuel economy, and, in extreme cases, increased downtime and higher maintenance costs due to premature replacement of "stuck injectors." The internal deposits are believed to be a result of certain common corrosion inhibitors, biofuel components and acidic friction modifier, or other carboxylic components used in the fuel reacting with trace amounts of transition metals, alkali metal and alkaline earth metals causing salts that are relatively insoluble in ultra low sulfur diesel (ULSD) fuels compared to the better solubility of such salts in the higher sulfur fuels. The salts may be composed mainly of sodium salts of alkenyl succinic acids. Sodium can enter the diesel fuel from a number of sources including refinery salt drivers, storage tank water bottoms and seawater used as ship ballast. When such salts are present in fuel that is used in a High Pressure Common Rail (HPCR) engines, the salts may tend to deposit in the very tight tolerance areas of the injectors. Such deposits may lead to stuck fuel injectors or poor fuel injection, which in turn may lead to lost power, lost fuel economy, rough running engines, and eventually excessive vehicle downtime and maintenance expense.

In accordance with the disclosure, exemplary embodiments provide a fuel composition and method for cleaning up internal components of a fuel injector and for improving injector performance for a diesel engine. The composition includes major amount of middle distillate fuel having a sulfur content of 50 ppm by weight or less, and from about 1 to about 30 ppm by weight based on a total weight of fuel of a fuel soluble hydrocarbyl sulfonic acid or salt such as an alkyl aryl sulfonic acid or salt thereof, wherein the alkyl aryl sulfonic acid or salt thereof is effective to improve injector performance.

One embodiment of the disclosure provides a method of improving the injector performance of a fuel injected diesel engine including operating the diesel engine on a fuel composition comprising a major amount of diesel fuel having a sulfur content of 50 ppm by weight or less and a minor amount of an alkyl aryl sulfonic acid or salt thereof. The amount of alkyl aryl sulfonic acid or salt thereof in the fuel ranges from about 1 to about 30 ppm based on a total weight of the fuel.

Another embodiment of the disclosure provides a method of unsticking stuck fuel injectors of a fuel injected diesel engine. The method includes operating the diesel engine on a fuel composition comprising a major amount of diesel fuel having a sulfur content of 50 ppm by weight or less and from about 1 to about 30 ppm by weight based on a total weight of fuel of a fuel soluble alkyl aryl sulfonic acid or salt thereof.

A further embodiment of the disclosure provides a method cleaning up internal components of a fuel injector for a diesel engine. The method includes operating a fuel injected diesel engine on a fuel composition comprising a major amount of diesel fuel having a sulfur content of 50 ppm by weight or less and from about 1 to about 30 ppm by weight of a fuel soluble alkyl aryl sulfonic acid or salt thereof.

Another embodiment of the disclosure provides a method for reducing an amount of salt deposits on internal components of a fuel injector for a fuel injected diesel engine. The method includes operating the diesel engine on a fuel composition comprising a major amount of fuel and a minor amount of a fuel soluble alkyl aryl sulfonic acid or salt thereof.

An advantage of the fuel additive described herein is that the additive may not only reduce the amount of internal deposits forming on direct and/or indirect diesel fuel injectors, but the additive may also be effective to clean up dirty fuel injectors. The unexpected benefits of the fuel additive described herein is quite surprising since much higher treat rates are generally required for conventional detergents to be effective for cleaning up dirty fuel injectors.

Additional embodiments and advantages of the disclosure may be set forth in part in the detailed description which follows, and/or may be learned by practice of the disclosure. It is to be understood that both the foregoing general description and the following detailed description are exemplary and explanatory only and are not restrictive of the disclosure, as claimed.

DETAILED DESCRIPTION OF EXEMPLARY EMBODIMENTS

The compositions of the present application that may be used in a minor amount in a fuel include a wide variety of metal-free hydrocarbyl soluble sulfonic acids or salts thereof. The metal-free fuel soluble hydrocarbyl sulfonic acids include, but are not limited to alkyl aryl sulfonic acids derived from benzene sulfonic acids, toluene sulfonic acids, naphthalene sulfonic acids, diphenyl sulfonic acids, xylene sulfonic acids and the like, and amine salts of the foregoing sulfonic acids. Other examples of hydrocarbyl sulfonic acids include, but are not limited to, alkyl sulfonic acids and salts, fatty acid sulfonic acids and salts, fatty ester sulfonic acids and salts, fatty amide sulfonic acids and salts, sulfosuccinic acids, sulfosuccinic esters, and sulfosuccinic amides.

As used herein, the term "hydrocarbyl group" or "hydrocarbyl" is used in its ordinary sense, which is well-known to those skilled in the art. Specifically, it refers to a group having a carbon atom directly attached to the remainder of a molecule and having a predominantly hydrocarbon character. Examples of hydrocarbyl groups include hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical). In general, no more than two, or as a further example, no more than one, non-hydrocarbon substituent will be present for every ten carbon atoms in the hydrocarbyl group; in some embodiments, there will be no non-hydrocarbon substituent in the hydrocarbyl group.

"Biorenewable fuels" and "biodiesel fuels" as used herein is understood to mean any fuel which is derived from resources other than petroleum. Such resources include, but are not limited to, corn, maize, soybeans and other crops; grasses, such as switchgrass, miscanthus, and hybrid grasses; algae, seaweed, vegetable oils; natural fats; and mixtures thereof. In an aspect, the biorenewable fuel may include monohydroxy alcohols, such as those having from 1 to about 5 carbon atoms. Non-limiting examples of suitable monohydroxy alcohols include methanol, ethanol, propanol, n-butanol, isobutanol, t-butyl alcohol, amyl alcohol, and isoamyl alcohol.

As used herein, the term "major amount" is understood to mean an amount greater than or equal to 50 wt. %, for example from about 80 to about 98 wt. % relative to the total weight of the composition. Moreover, as used herein, the term "minor amount" is understood to mean an amount less than 50 wt. % relative to the total weight of the composition.

As used herein, the term "salts or salt deposits" are understood to mean transition metal, alkali metal or alkaline earth metal carboxylates.

The metal-free fuel soluble hydrocarbyl sulfonic acids may be represented by the formula $RSO_2OH$, wherein R may be an alkyl or alkylaryl with 6-80 carbon atoms. The alkyl groups may be selected from linear and branched alkyl groups. A mixture of sulfonic acids resulting from treatment of various petroleum fractions with sulfonic acid known as "acid oil" or "mahogany acids" having molecular weight between 150 and 1000 are also acceptable either by themselves or with associated oil fractions. Suitable sulfonic acids of the foregoing formula may be selected from saturated or unsaturated, linear, branched and/or cyclic hydrocarbyl-substituted sulfonic acids having from 1 to 50 carbon atoms and typically having from 3 to 24 carbon atoms. Particular suitable sulfonic acids include aromatic sulfonic acids, such as alkylaromatic monosulfonic acids having one or more $C_1$-$C_{28}$-alkyl radicals and especially those having $C_3$-$C_{24}$-alkyl radicals. Examples include, but are not limited to methanesulfonic acid, butanesulfonic acid, benzenesulfonic acid, p-toluenesulfonic acid, xylenesulfonic acid, 2-mesitylenesulfonic acid, 4-ethylbenzene sulfonic acid, isopropylbenzene sulfonic acid, 4-butylbenzene sulfonic acid, 4-octylbenzene sulfonic acid, dodecylbenzene sulfonic acid, didodecylbenzenesulfonic acid, nonylnaphthalne sulfonic acid, and dinonylnaphthalene sulfonic acid. Particularly suitable sulfonic acids include, but are not limited to dodecylbenzene sulfonic acids, dinonylnaphthalene sulfonic acids, and mixed $C_{14}$-$C_{24}$ alkylbenzene sulfonic acids.

Amine salts of the foregoing sulfonic acids may also be used to provide similar benefits obtained by the sulfonic acid additives. The amine salts of the foregoing sulfonic acids may be made by reacting sulfonic acids of synthetic or petroleum alkyl aromatics with alkyl amines or alkyl polyamines. Petroleum sulfonic acids may be obtained by the treatment of a middle distillate petroleum fraction containing alkyl aromatic hydrocarbons with concentrated sulfuric acid or oleum. Synthetic sulfonic acids such as those obtained by acid or gaseous $SO_3$ treatment of alkyl aromatic hydrocarbons may be prepared by alkylating benzene, toluene, naphthalene and similar aromatics with an olefin such as polypropylene containing from about 4 to about 50 carbon atoms per molecule.

A variety of alkyl and cycloalkyl amines may be used for neutralizing the sulfonic acids described above. Mono amines and polyamines may be used. The amine or polyamine may contain from 2 to 100 carbon atoms and from 1 to 3 nitrogen atoms. The hydrocarbyl group may be derived from polymerization of olefins such as butylene and propylene. Suitable polyamines may contain 2 nitrogens and from 2 to 50 carbon atoms (e.g. ethylene diamine, propane diamines, and the like). Especially suitable polyamines are diamines containing from 3 to 26 carbon atoms. Other amines that may be used include, but are not limited to, oleylamide propyl dimethyl amine, and polybutenyl succinimides made from amines or polyamines. The amines may also contain ether linkages.

Examples of amine sulfonic acid salts are the reaction product of an alkyl benzyl sulfonic acid in which the alkyl group contains from 10 to 50 carbon atoms with one of the following: octadecyl amine, 1,2 propane diamine, N,N-dimethylcyclohexylamine, or an amine of the formula

$$R-O-R_1-NR^2-R^3-NR^4R^5$$

or the formula

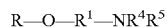

$$R-O-R^1-NR^4R^5$$

wherein R is an aliphatic group containing from to 26 carbon atoms, $R^1$ is an aliphatic group containing from 1 to 10 carbon atoms, $R^2$, $R^4$, and $R^5$ may be the same or different and are hydrogen, methyl, or ethyl, $R^3$ is an alkyl group containing from 2 to 6 carbon atoms.

When formulating the fuel compositions according to the disclosure, the hydrocarbyl soluble sulfonic acid or salt thereof may be employed in amounts sufficient to reduce or inhibit deposit formation in a diesel engine. In some aspects, the fuels may contain minor amounts of the above described sulfonic acid or salt thereof that controls or reduces the formation of engine deposits, for example injector deposits in diesel engines. For example, the diesel fuels of this application may contain, on an active ingredient basis, an amount of the hydrocarbyl soluble sulfonic acid or salt thereof in the range of about 1 mg to about 30 mg of per Kg of fuel, such as in the range of about 5 mg to about 20 mg per Kg of fuel. The active ingredient basis excludes the weight of (i) unreacted components associated with and remaining in the product as produced and used, and (ii) solvent(s), if any, used in the manufacture of the sulfonic acid during or after its formation but before addition of a carrier, if a carrier is employed. Quite unexpectedly, the hydrocarbyl sulfonic acid or salt thereof is effective in unsticking stuck fuel injectors when used in an amount ranging from about 5 to about 12 ppm by weight based on a total weight of the fuel composition.

One or more additional optional compounds may be present in the fuel compositions of the disclosed embodiments. For example, the fuels may contain conventional quantities of cetane improvers, corrosion inhibitors, cold flow improvers (CFPP additive), pour point depressants, detergents, dispersants, solvents, demulsifiers, lubricity additives, friction modifiers, amine stabilizers, combustion improvers, antioxidants, heat stabilizers, conductivity improvers, metal deactivators, marker dyes, organic nitrate ignition accelerators, cyclomatic manganese tricarbonyl compounds, and the like. In some aspects, the fuel compositions described herein may contain about 10 weight percent or less, or in other aspects, about 5 weight percent or less, based on the total weight of the additive concentrate, of one or more of the above additives. Similarly, the fuels may contain suitable amounts of conventional fuel blending components such as methanol, ethanol, dialkyl ethers, and the like.

In some aspects of the disclosed embodiments, organic nitrate ignition accelerators that include aliphatic or cycloaliphatic nitrates in which the aliphatic or cycloaliphatic group is saturated, and that contain up to about 12 carbons may be used. Examples of organic nitrate ignition accelerators that may be used are methyl nitrate, ethyl nitrate, propyl nitrate, isopropyl nitrate, allyl nitrate, butyl nitrate, isobutyl nitrate, sec-butyl nitrate, tert-butyl nitrate, amyl nitrate, isoamyl nitrate, 2-amyl nitrate, 3-amyl nitrate, hexyl nitrate, heptyl nitrate, 2-heptyl nitrate, octyl nitrate, isooctyl nitrate, 2-ethylhexyl nitrate, nonyl nitrate, decyl nitrate, undecyl nitrate, dodecyl nitrate, cyclopentyl nitrate, cyclohexyl nitrate, methylcyclohexyl nitrate, cyclododecyl nitrate, 2-ethoxyethyl nitrate, 2-(2-ethoxyethoxy)ethyl nitrate, tetrahydrofuranyl nitrate, and the like. Mixtures of such materials may also be used.

Examples of suitable optional metal deactivators useful in the compositions of the present application are disclosed in U.S. Pat. No. 4,482,357, issued Nov. 13, 1984, the disclosure of which is herein incorporated by reference in its entirety. Such metal deactivators include, for example, salicylidene-o-aminophenol, disalicylidene ethylenediamine, disalicylidene propylenediamine, and N,N'-disalicylidene-1,2-diaminopropane.

Suitable optional cyclomatic manganese tricarbonyl compounds which may be employed in the compositions of the present application include, for example, cyclopentadienyl manganese tricarbonyl, methylcyclopentadienyl manganese tricarbonyl, indenyl manganese tricarbonyl, and ethylcyclopentadienyl manganese tricarbonyl. Yet other examples of suitable cyclomatic manganese tricarbonyl compounds are disclosed in U.S. Pat. No. 5,575,823, issued Nov. 19, 1996, and U.S. Pat. No. 3,015,668, issued Jan. 2, 1962, both of which disclosures are herein incorporated by reference in their entirety.

The additives of the present application, including the reaction product described above, and optional additives used in formulating the fuels of this invention may be blended into the base diesel fuel individually or in various sub-combinations. In some embodiments, the additive components of the present application may be blended into the diesel fuel concurrently using an additive concentrate, as this takes advantage of the mutual compatibility and convenience afforded by the combination of ingredients when in the form of an additive concentrate. Also, use of a concentrate may reduce blending time and lessen the possibility of blending errors.

The fuels including diesel fuels of the present application may be applicable to the operation of both stationary diesel engines (e.g., engines used in electrical power generation installations, in pumping stations, etc.) and ambulatory diesel engines (e.g., engines used as prime movers in automobiles, trucks, road-grading equipment, military vehicles, etc.). For example, the fuels may include any and all middle distillate fuels, diesel fuels, biorenewable fuels, biodiesel fuel, gas-to-liquid (GTL) fuels, jet fuel, alcohols, ethers, kerosene, low sulfur fuels, synthetic fuels, such as Fischer-Tropsch fuels, liquid petroleum gas, bunker oils, coal to liquid (CTL) fuels, biomass to liquid (BTL) fuels, high asphaltene fuels, fuels derived from coal (natural, cleaned, and petcoke), genetically engineered biofuels and crops and extracts therefrom, and natural gas. The fuels may also contain esters of fatty acids.

Accordingly, aspects of the present application are directed to methods for reducing the amount of injector deposits of a diesel engine having at least one combustion chamber and one or more direct fuel injectors in fluid connection with the combustion chamber. In another aspect, the improvements may also be observed in indirect diesel fuel injectors. In some aspects, the methods comprise injecting a hydrocarbon-based compression ignition fuel comprising the hydrocarbyl sulfonic acid additive of the present disclosure through the injectors of the diesel engine into the combustion chamber, and igniting the compression ignition fuel. In some aspects, the method may also comprise mixing into the diesel fuel at least one of the optional additional ingredients described above.

EXAMPLES

The following examples are illustrative of exemplary embodiments of the disclosure. In these examples as well as elsewhere in this application, all parts and percentages are by weight unless otherwise indicated. It is intended that these examples are being presented for the purpose of illustration only and are not intended to limit the scope of the invention disclosed herein.

In the following examples, the effect sulfonic acid additives or salts thereof had on diesel fuel contaminated with carboxylate salts for high pressure common rail diesel fuel systems was evaluated. An engine test was used to demonstrate the propensity of fuels to provoke fuel injector sticking and was also used to demonstrate the ability of certain fuel additives to prevent or reduce the amount of internal deposit in the injectors. An engine dynamometer test stand was used for the installation of the Peugeot DW10 diesel engine for running the injector sticking tests. The engine was a 2.0 liter engine having four cylinders. Each combustion chamber had four valves and the fuel injectors were DI piezo injectors have a Euro V classification.

The core protocol procedure consisted of running the engine through a cycle for 8-hours and allowing the engine to soak (engine off) for a prescribed amount of time. The injector performance was then characterized by measuring the cylinder exhaust temperature for each cylinder. A test was stopped and considered to have failed (one or more injectors sticking) if the exhaust temperature of any cylinder was more than 65° C. above any other cylinder exhaust temperature at any point in time. A test was also considered to have stuck injectors if after allowing the engine to cool to ambient temperature, a cold start showed a temperature difference of 40° C. or more in cylinder exhaust temperatures. Sticking of the needle and thus failure could also be confirmed by disassembling the injector and subjectively determining the force required to remove the needle from the nozzle housing. Cleanliness tests were run for keep-clean performance as well as clean-up performance.

Test preparation involved flushing the previous test's fuel from the engine prior to removing the injectors. The test injectors were inspected, cleaned, and reinstalled in the engine. If new injectors were selected, the new injectors were put through a 16-hour break-in cycle. Next, the engine was started using the desired test cycle program. Once the engine was warmed up, power was measured at 4000 RPM and full load to check for full power restoration after cleaning the injectors. If the power measurements were within specification, the test cycle was initiated. The following Table 1 provides a representation of the DW10 sticking test cycle that was used to evaluate the fuel additives according to the disclosure.

TABLE 1

One hour representation of DW10 sticking test cycle.

| Step | Duration (minutes) | Engine speed (rpm) | Load (%) | Torque (Nm) | Boost air after Intercooler (° C.) |
|---|---|---|---|---|---|
| 1 | 2 | 1750 | 20 | 62 | 45 |
| 2 | 7 | 3000 | 60 | 173 | 50 |
| 3 | 2 | 1750 | 20 | 62 | 45 |
| 4 | 7 | 3500 | 80 | 212 | 50 |
| 5 | 2 | 1750 | 20 | 62 | 45 |
| 6 | 10 | 4000 | 100 | * | 50 |
| 7 | 2 | 1250 | 10 | 25 | 43 |
| 8 | 7 | 3000 | 100 | * | 50 |
| 9 | 2 | 1250 | 10 | 25 | 43 |
| 10 | 10 | 2000 | 100 | * | 50 |
| 11 | 2 | 1250 | 10 | 25 | 43 |
| 12 | 7 | 4000 | 100 | * | 50 |

Injector Sticking Engine Test

Diesel engine nozzle sticking tests were conducted using the Peugeot DW10 engine following the protocol of Table 1.

For keep-clean testing, the engine was run with diesel fuel doped with 0.5 ppm sodium that was delivered from dissolved sodium naphthenate and a detergent additive indicated in the example. For clean-up testing, the engine was first run with diesel fuel doped with 0.5 ppm sodium as described above without a detergent additive to establish a baseline of stuck fuel injectors. Next, the engine was run with the same fuel containing the detergent additive indicated. In all of the tests, the fuels tested contained 200 ppmv lubricity modifier and 1600 ppmv cetane improver, 10 ppmw of dodecyl succinic acid. At the beginning of the test, no injector sticking was indicated by a uniform exhaust gas temperature for all 4-cylinders. However, a cold start of the engine after 8 hours showed injector sticking for all 4-cylinders.

Comparative Example 1

In this example, a conventional succinimide detergent additive was added to the fuel at treat rates of 10 ppmw (Run 1) and 150 ppmw (Run 2). The detergent additive was a polyisobutenyl succinimide (PIBSI) made from polyisobutenyl succinic anhydride and tetraethylene pentamine (TEPA) at a molar ratio of 1.6:1 (PIBSA/TEPA). In Runs 1 and 2, the injectors were stuck after the dirty up phase of the test. The power loss in Run 1 during the dirty up phase of the test was from a base line of 0 to 3.01% power loss. The succinimide detergent of Run 1 provided slightly more power loss to 3.17% power loss during the 8 hour clean up period of the test. At a treat rate of 150 ppmw the succinimide detergent (Run 2) provided a power recovery of from −3.12% to −1.73%.

Example 2

In this example, additives of the disclosure at treat rates of 10 to 20 ppm by weight of fuel were compared to a Comparative Example 1 used at treat rates of 10 and 150 ppm by weight of fuel to determine if the additive cleaned up sticking fuel injectors and/or improved the percent power recovery of the engine after a dirty up cycle as described above. In the following table, Inventive Example 1 was a branched dodecylbenzene sulfonic acid. Inventive Example 2 was a linear dodecylbenzene sulfonic acid. Inventive Example 3 was dinonylnaphthalene sulfonic acid. Inventive Example 4 was a mixed $C_{14}$-$C_{24}$alkylbenzene sulfonic acid. Inventive Example 5 was an amine salt made by mixing $C_{14}$-$C_{24}$alkylbenzene sulfonic acid and N,N-dimethylcyclohexylamine at a molar ratio of 1.0:1.0. In all of the runs, the injectors were stuck after a dirty-up phase of the test. The clean up test results are shown in Table 2.

TABLE 2

| Run No. | Power Change After Base Fuel Dirty Up (%) | Additive Used for Clean Up | Additive Treat Rate (active ppm by mass) | Power Change after Additized Fuel Clean Up (%) | Power Recovery after Additized Fuel Clean Up (%) | Injector Sticking After Additized Fuel Clean Up |
|---|---|---|---|---|---|---|
| 1 | −3.01 | Comp. Example 1 | 10 | −3.17 | −5.3 | Yes |
| 2 | −3.12 | Comp. Example 1 | 150 | −1.73 | 44.6 | No |
| 3 | −4.89 | Inventive Ex. 1 | 10 | −0.38 | 92.2 | No |
| 4 | −3.12 | Inventive Ex. 2 | 20 | −0.49 | 84.3 | No |
| 5 | −2.88 | Inventive Ex. 3 | 10 | −0.73 | 74.7 | No |
| 6 | −3.72 | Inventive Ex. 4 | 10 | −0.70 | 81.1 | No |
| 7 | −3.17 | Inventive Ex. 4 | 10 | −0.74 | 76.6 | No |
| 8 | −3.24 | Inventive Ex. 5 | 10 | −0.69 | 78.7 | No |

As indicated by the foregoing examples, fuel additives containing the hydrocarbyl sulfonic acid additive or salt thereof of the disclosure provides a surprisingly significant reduction in internal deposits in diesel fuel injectors when engines are operated on ULSD fuels as compared to conventional fuel detergent additives. The foregoing results showed that the detergent additives of the disclosure were significantly more effective for cleaning up dirty fuel injectors than conventional detergents as evidenced by the power recovery shown in Table 2.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method of improving the injector performance of a fuel injected diesel engine comprising operating the diesel engine on a fuel composition comprising a major amount of diesel fuel having a sulfur content of 50 ppm by weight or less and a minor amount of an alkyl aryl sulfonic acid or amine salt thereof, wherein the amount of alkyl aryl sulfonic acid or salt thereof in the fuel ranges from 5 to about 30 ppm by weight based on a total weight of the fuel composition.

2. The method of claim 1, wherein the alkyl group of the alkyl aryl sulfonic acid or amine salt thereof contains from 5 to 50 carbon atoms.

3. The method of claim 2, wherein the alkyl groups are selected from the group consisting of linear alkyl groups.

4. The method of claim 2, wherein the alkyl groups are selected from the group consisting of branched alkyl groups.

5. The method of claim 1, wherein the alkyl aryl sulfonic acid or salt thereof is selected from the group consisting of dodecylbenzene sulfonic acids, dinonylnaphthalene sulfonic acids, and mixed $C_{14}$-$C_{24}$ alkylbenzene sulfonic acids.

6. The method of claim 1, wherein the fuel injected diesel engine comprises a direct fuel injected diesel engine.

7. A method of unsticking stuck fuel injectors of a fuel injected diesel engine comprising operating the diesel engine on a fuel composition comprising a major amount of diesel fuel having a sulfur content of 50 ppm by weight or less and from 5 to about 30 ppm by weight based on a total weight of fuel of a fuel soluble alkyl aryl sulfonic acid or amine salt thereof.

8. The method of claim 7, wherein the fuel injected diesel engine is a direct fuel injected diesel engine.

9. The method of claim 7, wherein the alkyl group of the alkyl aryl sulfonic acid or amine salt thereof contains from 5 to 50 carbon atoms.

10. The method of claim 9, wherein the alkyl groups are selected from the group consisting of linear and branched alkyl groups.

11. The method of claim 7, wherein the alkyl aryl sulfonic acid or amine salt thereof is selected from the group consisting of dodecylbenzene sulfonic acids, dinonylnaphthalene sulfonic acids, and mixed $C_{14}$-$C_{24}$ alkylbenzene sulfonic acids.

12. A method cleaning up internal components of a fuel injector for a diesel engine comprising operating a fuel injected diesel engine on a fuel composition comprising a major amount of diesel fuel having a sulfur content of 50 ppm by weight or less and from 5 to about 30 ppm by weight of a fuel soluble alkyl aryl sulfonic acid or amine salt thereof based on a total weight of the fuel composition.

13. The method of claim 12, wherein the alkyl aryl sulfonic acid or amine salt thereof is effective to remove salt deposits selected from the group consisting of transition metal, alkali metal and alkaline earth metal carboxylates from the internal components of the fuel injector.

14. The method of claim 13, wherein the fuel injected diesel engine comprises a direct fuel injected diesel engine.

15. The method of claim 12, wherein the alkyl aryl sulfonic acid or amine salt thereof is selected from the group consisting of dodecylbenzene sulfonic acids, dinonylnaphthalene sulfonic acids, and mixed $C_{14}$-$C_{24}$ alkylbenzene sulfonic acids.

16. A method for reducing an amount of salt deposits on internal components of a fuel injector for a fuel injected diesel engine comprising operating the diesel engine on a fuel composition comprising a major amount of fuel and from 5 to about 30 ppm by weight of a fuel soluble alkyl aryl sulfonic acid or amine salt thereof based on a total weight of the fuel composition.

17. The method of claim 16, wherein the fuel injected diesel engine is a direct fuel injected diesel engine.

18. The method of claim 16, wherein the salt deposits are selected from the group consisting of transition metal, alkali metal and alkaline earth metal carboxylates from the internal components of the fuel injector.

19. The method of claim 16, wherein the fuel is an ultra low sulfur diesel fuel.

* * * * *